Oct. 4, 1932.   F. L. WOOD ET AL   1,880,638
FASTENING DEVICE FOR CHOPPER BOWLS
Filed Aug. 4, 1928   2 Sheets-Sheet 1
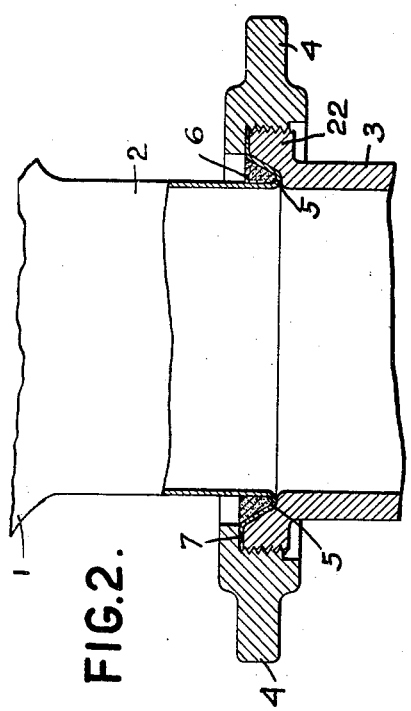
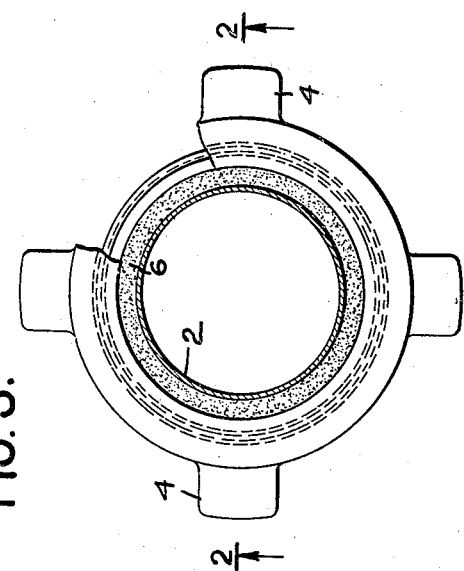
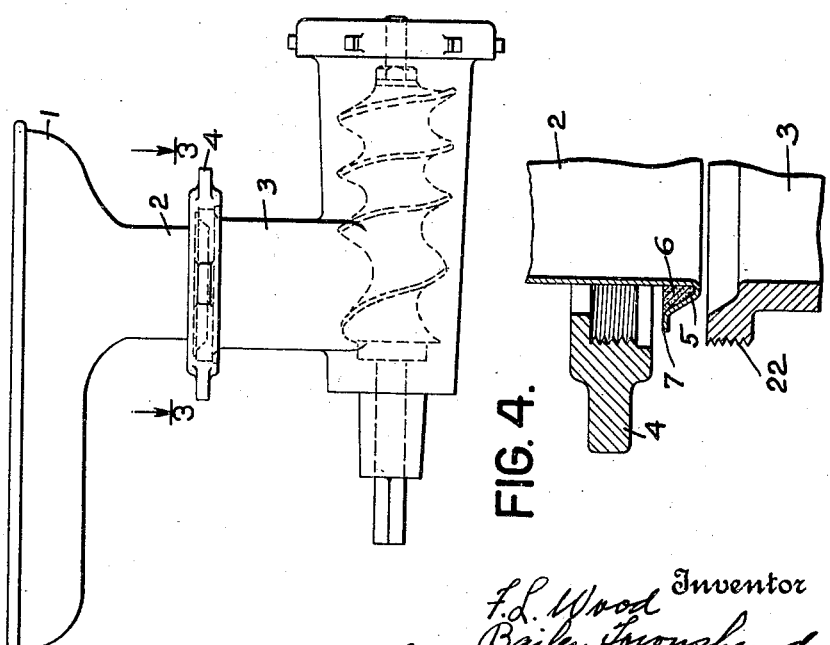

Oct. 4, 1932.    F. L. WOOD ET AL    1,880,638
FASTENING DEVICE FOR CHOPPER BOWLS
Filed Aug. 4, 1928    2 Sheets-Sheet 2
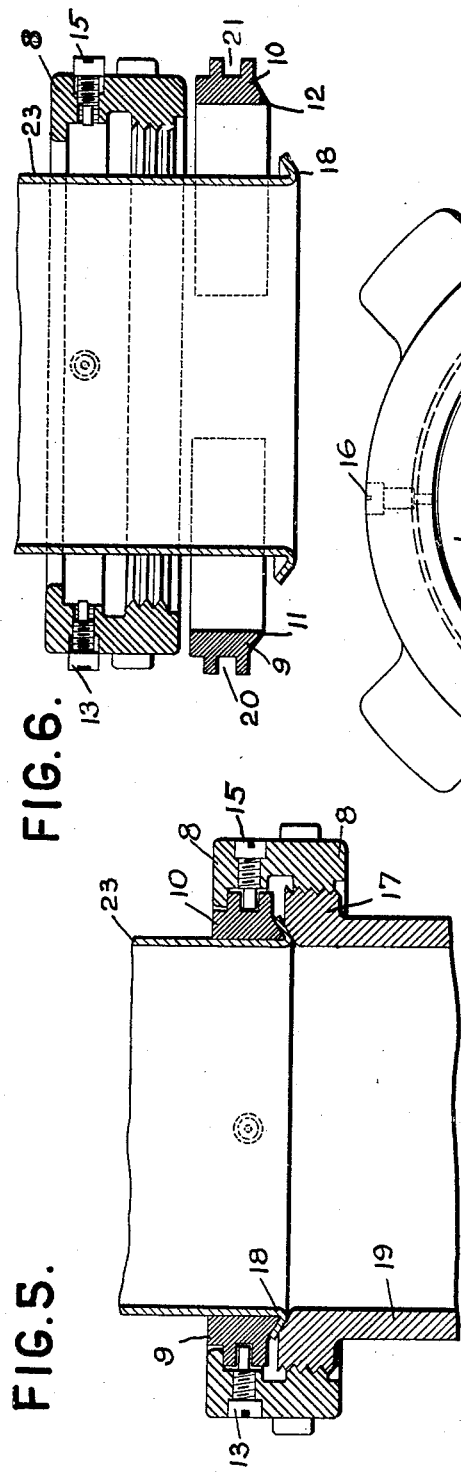
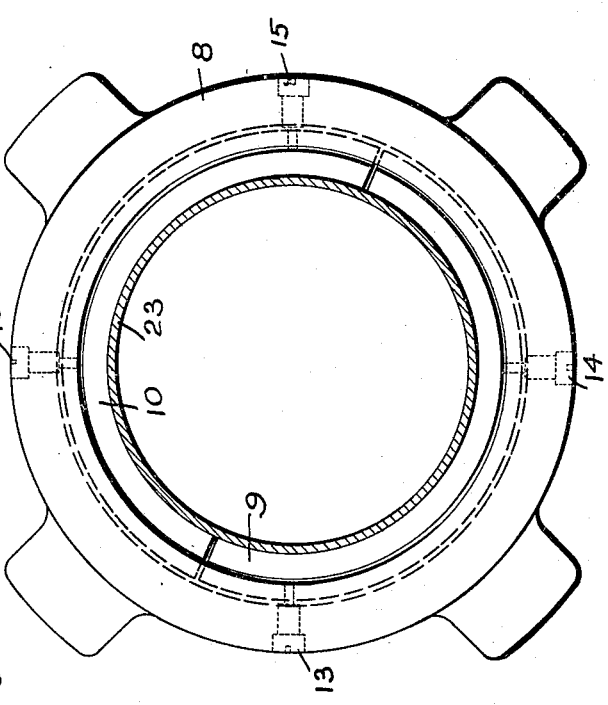

Patented Oct. 4, 1932

1,880,638

UNITED STATES PATENT OFFICE

FOSTER L. WOOD, OF DAYTON, OHIO, AND BAILEY TOWNSHEND, OF JACKSON HEIGHTS, LONG ISLAND, NEW YORK, ASSIGNORS TO DAYTON SCALE COMPANY, OF DAYTON, OHIO, A CORPORATION OF NEW JERSEY

FASTENING DEVICE FOR CHOPPER BOWLS

Application filed August 4, 1928. Serial No. 297,517.

This invention relates to a meat or food chopper and especially to a new and improved fastening device for securing the bowl on the chopper.

The main object of the invention is to provide a fastening device for clamping a bowl to a meat chopper, whereby all clamping means are arranged on the outside of the hollow stem of the bowl and meat chopper.

Another object of the invention is to provide such a fastening means as will allow easy cleaning of the several parts.

Another object of the invention is to provide an outwardly extending flange on the end of the bowl, for clamping it with the meat chopper.

Still other objects of the invention may be seen from the following specification and the drawings, of which:

Fig. 1 is a view of a meat chopper with its bowl fastened in place according to the invention.

Fig. 2 is a cross sectional view on line 2—2 of Fig. 3.

Fig. 3 is a view on line 3—3 of Fig. 1.

Fig. 4 shows a detail of certain parts in Fig. 2 to an enlarged scale.

Fig. 5 is a cross sectional view of another embodiment of the invention.

Fig. 6 shows the manner in which the parts in Fig. 5 are assembled.

Fig. 7 is a sectional view taken at right angles to Fig. 5.

In Fig. 1 the bowl designated at 1 is made of sheet metal and connected at its lower end of its stem 2 with the adapter 3 of the meat chopper by means of a threaded ring 4. Ring 4 is placed over on the stem 2 and later on the bottom of stem 2 is formed into a flange, preferably by spinning, although it may be done by upsetting or otherwise, of such dimensions that the ring 4 is thereafter nondetachable and in consequence cannot be lost.

A groove 6 formed in the flange 5 of the stem 2 may preferably be filled with solder. The adapter 3 is provided with an extension collar 22 screw threaded to coact with the ring 4. When the bowl is put on the adapter of the meat chopper and ring 4 is turned the bowl will be closely fastened on the adapter especially since the form of the adapter on its upper end corresponds to the flange 5 of the stem 2. In consequence of the provision of the outwardly extending flange 5 and collar 7 a smooth surface is provided on the interior of the chute through which the meat is fed to the chopper.

This form of the device is open to the objection that the clamping ring 4 when once secured to the stem 2 may not be removed therefrom.

Another form of embodiment of the present invention is shown in Figs. 5 to 7. According to this embodiment the ring 8 is removable from the stem 9. For this purpose there is provided a ring split into arcuate portions 9 and 10, the lower ends of which have edges 11 and 12 conform to the groove formed by flange 18 on the stem 23.

The threaded ring 8 in this case has such a diameter that the ring 8 may be removed over the flange 18. It may be seen from Fig. 5 showing the device in its fixed position, the intermediate rings 9 and 10 are located within the threaded clamping ring 8. The latter is connected by its screw threads with the collar 17 of the stem of the chopper.

In this way the flange 18 and accordingly the bowl are clamped by the ring 8 and intermediate rings 9 and 10 against the chopper stem 19. When a bowl has to be put on the chopper the main clamping ring 8 is first placed on the bowl stem 9 and set screws 13 to 16 therein are loosened as may be seen in Fig. 6. Then the two halves 9 and 10 of the intermediate split ring are placed on the stem and main clamping ring 8 is screwed into place over the split ring. The split ring is provided with grooves 20 and 21 into which pass set screws 13 to 16 to permit free turning of the main clamping ring. The collar 17, split rings 9 and 10, and flange 18 have their coacting surfaces of corresponding configuration. Thus a firm connection is provided of which all parts are readily removable from the elements to be clamped.

While we have shown and described and pointed out the fundamental novel features of the invention as applied to a single modification it will be understood that various omissions and substitutions and changes in the form and details of the device illustrated and in its operation may be made by those skilled in the art without departing from the spirit of the invention. We intend to be limited therefore only by the scope of the following claims:

1. A clamping device for securing a feed pan having a hollow stem portion to a chopper also having a hollow stem portion comprising an outwardly extending and externally screw threaded collar formed on the stem of said chopper, an outwardly extending grooved flange on the end of the stem of the pan, an annulus comprising a plurality of detached arcuate portions located around said flange and having lower configurations conforming to the groove formed by the flange, clamping means provided with screws projecting into a groove of said annulus and on its lower part with internal screw threads corresponding to those of said collar for clamping said outwardly extending flange to said collar by means of said annulus.

2. A coupling device for a pair of members, comprising a ring element detachably connected to one of said members, a second ring element surrounded by the other element and having a clamping face for engaging the other of the members, a peripheral groove in one of said elements and a detachable pin in the other element for entering said groove to abut the walls of the groove to detachably secure the elements together.

3. A coupling device for a pair of tubular members comprising an annular ring element detachably connected to one member, a second annular element surrounded by the other element and having a portion adapted to engage the other member, an annular peripheral groove formed in one of the elements and a radially extending screw carried by the other element entering said groove and abutting the walls thereof to secure the elements together.

4. A coupling device for a pair of tubular members comprising an element detachably connected to one of the members, a second element surrounded by the other element and engaging the other of the members, and a threaded member freely rotatably engageable with one of said elements and secured to the other element to hold the elements against movement axially of said tubular members while permitting relative rotation between said elements.

5. A coupling device for a pair of tubular members comprising a ring element threadedly secured to one of the members, a second ring element engaging the other member and embraced by the first-named ring element, said second ring element having a plurality of parallel flanges, an annular lug on the first-named ring element engaging one flange on the other ring element and removable elements carried by the first-named element for engaging another flange on the second-named element member, rotation of the first-named element member effecting longitudinal movement of the second-named ring element to couple the tubular members together.

6. In a chopper, a sheet metal feed pan having a depending circular stem turned up at the lower end to provide an upwardly extending flange having a beveled portion and a horizontal portion, a chopper having an upwardly extending circular hopper provided at the upper end with a beveled edge for engaging the beveled portion of the flange and a horizontal edge beyond the beveled edge for engaging the horizontal portion of said stem, and a one-piece completely circular coupling ring element threaded on the upper portion of the hopper and having an integral horizontal flange for engaging the horizontal portion of the first-named flange to clamp it against the horizontal edge of the hopper and thereby secure the feed pan to the hopper.

In testimony whereof we hereto affix our signatures.

BAILEY TOWNSHEND.
F. L. WOOD.

CERTIFICATE OF CORRECTION.

Patent No. 1,880,638.　　　　　　　　　　　　　　　　October 4, 1932.

FOSTER L. WOOD ET AL.

It is hereby certified that error appears in the printed specification of the above numbered patent requiring correction as follows: Page 2, line 70, claim 5, after "second-named" and line 71, after "first-named" insert the word "ring"; and lines 71 and 72, same claim, strike out the word "member"; and that the said Letters Patent should be read with these corrections therein that the same may conform to the record of the case in the Patent Office.

Signed and sealed this 13th day of December, A. D. 1932.

(Seal)　　　　　　　　　　　　　　　　　　　　　M. J. Moore,
　　　　　　　　　　　　　　　　　　　　Acting Commissioner of Patents.